CRYOGENIC SHIFT REGISTER

Filed Aug. 4, 1960 4 Sheets-Sheet 1

Inventors:
Vernon L. Newhouse,
John W. Bremer,
Harold H. Edwards,
by Richard R. Brainard
Their Attorney.

Inventors:
Vernon L. Newhouse,
John W. Bremer,
Harold H. Edwards,
by Richard R. Brainard
Their Attorney.

Inventors:
Vernon L. Newhouse,
John W. Bremer,
Harold H. Edwards,
by Richard R. Brainard
Their Attorney.

Fig. 7.b.

Inventors:
Vernon L. Newhouse,
John W. Bremer,
Harold H. Edwards,
by Richard R Brainard
Their Attorney.

United States Patent Office 3,123,720

Patented Mar. 3, 1964

3,123,720
CRYOGENIC SHIFT REGISTER

Vernon L. Newhouse, Scotia, N.Y., John W. Bremer, Sunnyvale, Calif., and Harold H. Edwards, Schenectady, N.Y., assignors to General Electric Company, a corporation of New York Filed Aug. 4, 1960, Ser. No. 47,538
6 Claims. (Cl. 307—88.5)

This invention relates to a cryogenic electronic shift register and more particularly to such a register formed of novel cryogenic electronic storage elements.

Certain electrical conductors are known to exhibit a loss of electrical resistance at super-cold temperatures approaching absolute zero and to regain this resistance in the presence of a specified magnetic field. A switching device employing this phenomenon may be constructed by surrounding a first such conductor with a coil formed of a conducting material, means being provided to maintain the device below the temperature at which resistance in the first conductor substantially disappears. A current is passed through the coil surrounding the first conductor and when this current is raised to a value sufficient to produce a "critical" magnetic field within the coil, the first conductor returns to a resistive or normal state. Therefore a switching action may be secured by passing a controlling current through the aforementioned coil to switch a current in the first conductor.

Since the controlled conductor exhibits two distinctly different electrical states, i.e., the superconducting or non-resistive state and the resistive or normal state, it may be employed advantageously as a computer memory or logic element. Bistable circuits may be formed of such elements which are capable of assuming and retaining a certain current carrying condition.

An advantageous construction employed in the present invention is a cryogenic electronic device of the type disclosed and claimed in the copending application of Vernon L. Newhouse and John W. Bremer, Serial No. 758,474 filed September 2, 1958, now Patent No. 3,076,-102, which is assigned to the assignee of the present invention, wherein a cryogenic electronic unit is formed from a first "gate" layer consisting of a metallic film deposited upon an insulating substrate with a second or "grid" film layer deposited thereacross and insulated therefrom. A current of predetermined proportion applied to the grid will cause a magnetic field to exist around the grid. This field exceeds the critical field of the gate thereunder, thereby tending to force the gate into a resistive or normal condition. Current gain may be realized by use of a narrow thin grid since its narrowness allows the grid current that is necessary to establish a critical field intensity to be less. The field intensity around the narrow grid is stronger and therefore more effective. Devices of this type may be greatly miniaturized and tightly packed without altering their operation.

It is possible by assembling a sufficient number of such cryogenic devices into two-stage "flip-flops," and "and-gates," to form counting circuits, shift-registers, and the like. However, such constructions are cumbersome, use an unnecessarily large number of elements, and because of their positive feedback action are difficult to design and have narrow tolerances of operation.

It is therefore an object of this invention to provide an improved shift register formed of cryogenic electronic units.

It is another object of this invention to provide an improved cryogenic electronic shift register which is exceedingly small and compact and rapid in operation.

In accordance with the present invention, the shift register is formed by consecutively intercoupling a plurality of superconducting loop circuits. Each loop comprises a similar gate portion and a grid portion in a parallel combination to which a source of current may be applied. The intercoupling between consecutive loops is produced by crossing the gate portion of each said loop with a grid portion of the preceding loop to form a continuous chain or register. A reset grid also crosses each gate portion for terminating transmitted circulating currents. The loop circuits are arranged in groups of at least three, per bit stored in the register.

The subject matter which we regard as our invention is particularly pointed out and distinctly claimed in the concluding portion of this specification. The invention, however, both as to method of operation and organization, together with further objects and advantages thereof, may best be understood by reference to the following description taken in connection with the accompanying drawings wherein like reference characters refer to like elements when in which:

Figure 7A:
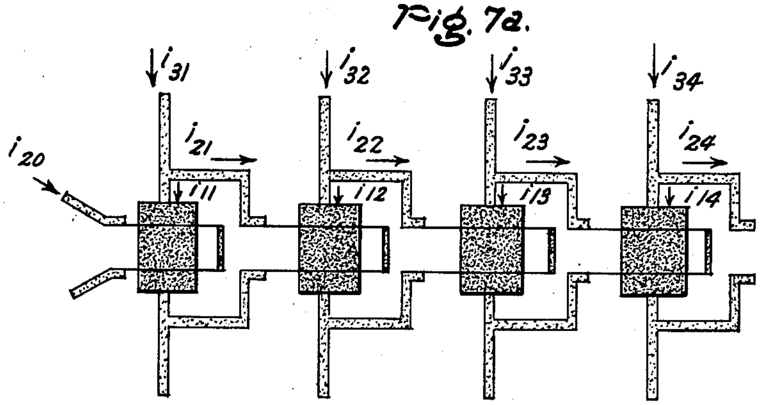

FIGURE 7*b* is a characteristic curve of a shift register device illustrated in simplified fashion in FIG. 7*a*.

In copending application Serial No. 311,272, filed August 19, 1963, a division of copending application Serial No. 47,539 of John W. Bremer and Vernon L. Newhouse, filed concurrently herewith, there is described and claimed a Cryogenic Electronic Memory Unit of small size, providing improved input and output means for taking advantage of the superconductive properties of certain materials. The shift register according to the present invention advantageously combines a plurality of similar memory units of an improved character and particularly adapted to a shift register cooperation.

Figure 1:
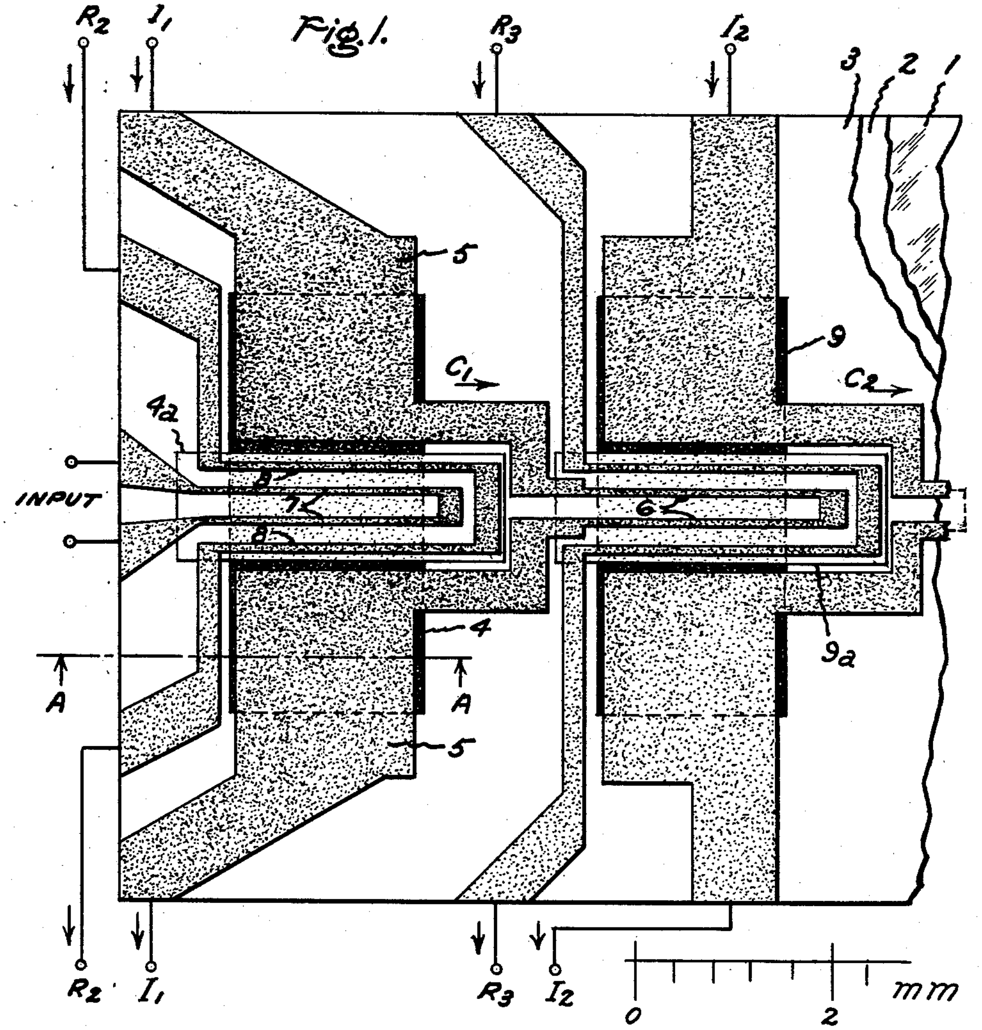
FIGURE 1 is a plan view of one cell of the shift register according to the present invention, together with a portion of a second such cell and interconnections therebetween.

Referring to FIGURE 1, a glass plate substrate 1 has deposited thereon a lead shield plane 2 separated by a thin layer of deposited silicon monoxide insulation 3 from a strip 4, called a gate, of superconductive material having a relatively low critical field which may, for example, be formed of tin. Connections 5, formed of a material having a higher critical field, for example, lead, are deposited over either end of the tin gate 4, making electrical contact thereto and these deposited connections are extended transversely away from the tin film to form a narrow retroflexed grid 6 deposited across a second tin gate 9 of a succeeding circuit with a thin layer of silicon monoxide insulation 9*a* therebetween. A complete superconductive loop is thus established including gate 4, grid 6 and connections 5. A retroflexed grid 7, for connection to input terminals, is deposited across the gate 4 while being insulated therefrom with an intermediate layer of insulation 4*a*. Another retroflexed gate, 8, deposited across gate 4 and similarly insulated therefrom, is provided for connection to a source of reset pulses.

Figure 2:
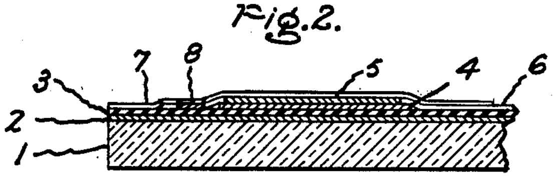
FIGURE 2 is a partial cross section of the FIGURE 1 device taken along the section A—A.

The cross-sectional view of FIGURE 2 is exaggerated in thickness to illustrate to the placement of these various layers. The respective layers are vacuum-deposited as thin films over one another by arranging the aforementioned substrate in a vacuum container with a cutout shield in the shape of the desired deposit positioned between the substrate and a heated molybdenum boat containing the desired material. In this manner in a specific construction, the tin gate portion, 4, is deposited over layer 3 to a depth of 0.3 microns and a 0.4 micron silicon monoxide insulating layer *4a* is then laid down over the central portion of the gate 4, over which lead grids 7 and 8 are deposited to a thickness of one micron. Connections 5 and grid 6, formed of lead, are also laid down to a depth of 1 micron, grid 6 being deposited as grid 7 over an insulating layer. No insulating material is deposited in the immediate area between gate 4 and connection 5, however, so as to establish an electrical contact therebetween.

Current conducting grids 6, 7 and 8 are employed for the purpose of rendering the associated gates resistive or normal by generation of magnetic fields across these gates stronger than their "critical" field strength. The respective grids 6, 7 and 8 are very narrow where they cross their underlying gates in order to increase the boundary magnetic field intensity generated by a given current flowing therethrough to facilitate rendering the underlying gate resistive. This narrowness of the grids, here approximately 30 microns, enhances the gain of the unit, which is defined as the ratio of maximum current which the gate can carry and remain superconductive to the minimum grid current required to make the gate resistive at low currents. Since one such unit is here employed to drive the next following unit, it is desired that this gain be as great as possible. Grids as narrow as 15 microns have been used.

The respective grids and gates of the FIGURE 1 device are constructed of different materials selected so that the critical or normalizing field strength for the gate conductors is less than for associated grid conductors. At 3.5° K., a typical operation temperature for such a device, the transition fields at which the superconducting tin and lead materials hereinbefore mentioned become resistive, are approximately 30 oersteds and 600 oersteds, respectively. It is understood that other materials having a similar differential in field criticality may be employed to insure the respective grids are capable of normalizing gates over which they lie without themselves becoming resistive.

The device is maintained, by a means not illustrated, at an appropriately low temperature, which for presently known superconductive materials is in the range of liquid helium or hydrogen temperatures. The apparatus may be submerged in liquid helium contained in a Dewar vessel that is surrounded by liquid nitrogen contained in a larger Dewar vessel. This low temperature arrangement is called a cryostat.

Figure 7A:
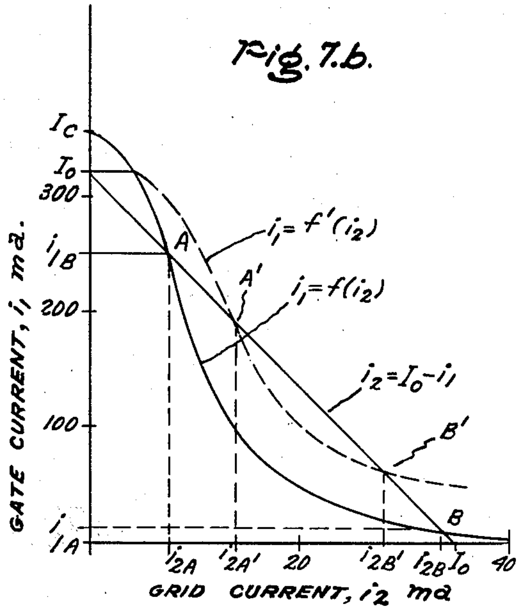

The curve, $i_1=f(i_2)$, in FIGURE 7, is a normal characteristic curve for a FIGURE 1 type of device employing the suggested materials, i.e. tin for the gate and lead for other conductors. For any particular current in the gate 4 the curve indicates the corresponding grid current which will just render the gate 4 resistive. The normal operating current through the gate 4 should never exceed $I_c$, since the gate would then be rendered resistive at all times. Therefore, the applied current $I_1$, should not exceed $I_c$ since, as will be seen, most of this current will flow through the gate 4.

When a current $I_1$, preferably derived from a constant current source (not shown) is applied to the parallel combination of gate 4 and grid 6 through connections 5, this current during its transient built-up phase will divide in the parallel combination in inverse proportion to the inductance of the branches. This proportionate current division remains in a steady stage or D.-C. case after the initial rise of current because in the steady state case there will be no voltage drop available across either superconducting branch to alter the current distribution.

The present device is constructed with a wide and direct current path through connections 5 and gate 4, and a longer, circuitous and much narrower path through the branch including grid 6. This differential arrangement, which can be observed from FIG. 1, drawn approximately to scale in this regard, results in a ratio of grid inductance to gate inductance approximately 50 to 1. Substantially all of an applied $I_1$ current from the constant current source will then flow in gate 4 and the small remainder in grid 6 will have no effect on gate 9 over which it lies since this current will be much below the grid current required to make a gate resistive. However, if an input current of appropriate magnitude, as indicated by the FIG. 7 curve, is applied to grid 7, the gate 4 will be rendered resistive and the current $I_1$ will be forced to flow through the high inductance grid 6, before returning to its source. $I_1$ is preferably obtained from a constant current source to insure forcing full current through grid 6. It should be noted, however, that an ordinary source, with resistance, will appear to the present device to be nearly a constant current source.

Although an applied $I_1$ initially encounters the aforementioned parallel inductances, it will be appreciated, as above, that after $I_1$ has been diverted, no voltage drop will occur across superconducting grid 6 in the steady state case. Therefore, even though the input applied to grid 7 is then removed, the current $I_1$ will remain diverted to grid 6 since no voltage drop can reinitiate a greater current in gate 4. However, in the present instance the input to grid 7 is removed and $I_1$ is then also concluded. The current flowing through the inductance of grid 6 produces a reaction voltage thereacross when the current $I_1$ is removed which is able to initiate a current in the upwards direction in gate 4 of a proportion equal to that previously flowing in grid 6 reduced by the initial small inductance encountered in gate 4. This current, $C_1$, will continue to circulate in the loop formed by gate 4 and grid 6, indefinitely as long as all portions of this circuit remain superconductive, and will be terminated, for example, by application of a reset impulse $R_2$ through grid 8 of a current sufficient to render the gate 4 resistive once more.

When a current $I_1$ is applied to a parallel gate and grid combination without one leg thereof having been made resistive, no persistent current will have been established in the loop since, at the termination of $I_1$, the reaction voltage caused by the smaller current in the larger inductance will be equal and opposite to the reaction voltage caused by the larger current in the smaller inductance.

In order to thus establish a persistent current in the loop, then, one branch thereof may be made resistive during introduction and diversion of current to the other branch; then the first branch is allowed to become superconductive again before the outside source of current is removed. Upon termination of the outside current a persistent loop current is established.

In the present device a "one" or bit of information is indicated by the presence of a persistent current in the loop formed of gate 4 and grid 6, and a "zero" is indicated by a lack of such persistent loop current. If a "one" is thus stored in the loop including grid 6, this current is capable of diverting current in the next succeeding loop inasmuch as the grid 6 lies across a gate 9 of the next loop, and grid 6 has a current flowing therein of very nearly $I_1$, sufficient to render gate 9 resistive. A circulating current in one loop in this manner diverts the current in a next succeeding loop; this diversion is then the first step of establishing a persistent current in the second loop to "shift" a "one" therein. The persistent current in the first loop is then erased by application of a reset pulse $R_2$ to erase grid 8 to clear the previous stage.

It is appreciated that various changes may be made in the structure of the FIG. 1 device without departing from the invention. For example, other deposition thicknesses may be employed and the order of depositing the various layers may be altered so long as they bear the same operative relationship to one another, i.e., grid to gate and shield to gate. The shield plane may be omitted if desired with an attendant reduction in operating speed, or alternatively, a solid shield plane may be employed as a substrate, appropriately insulated from the subsequently deposited layers.

Time constants of slightly less than 0.4 microsecond have been achieved for the device of FIG. 1. Lower temperatures would permit a further increase in gain for the given configuration, allowing the gate to be made narrower or the grid wider, further decreasing the time constant.

The present device occupies a space of approximately 6 sq. mm. High degrees of packing are possible due to the very low power dissipation requirements of the unit.

Figures 3, 4:
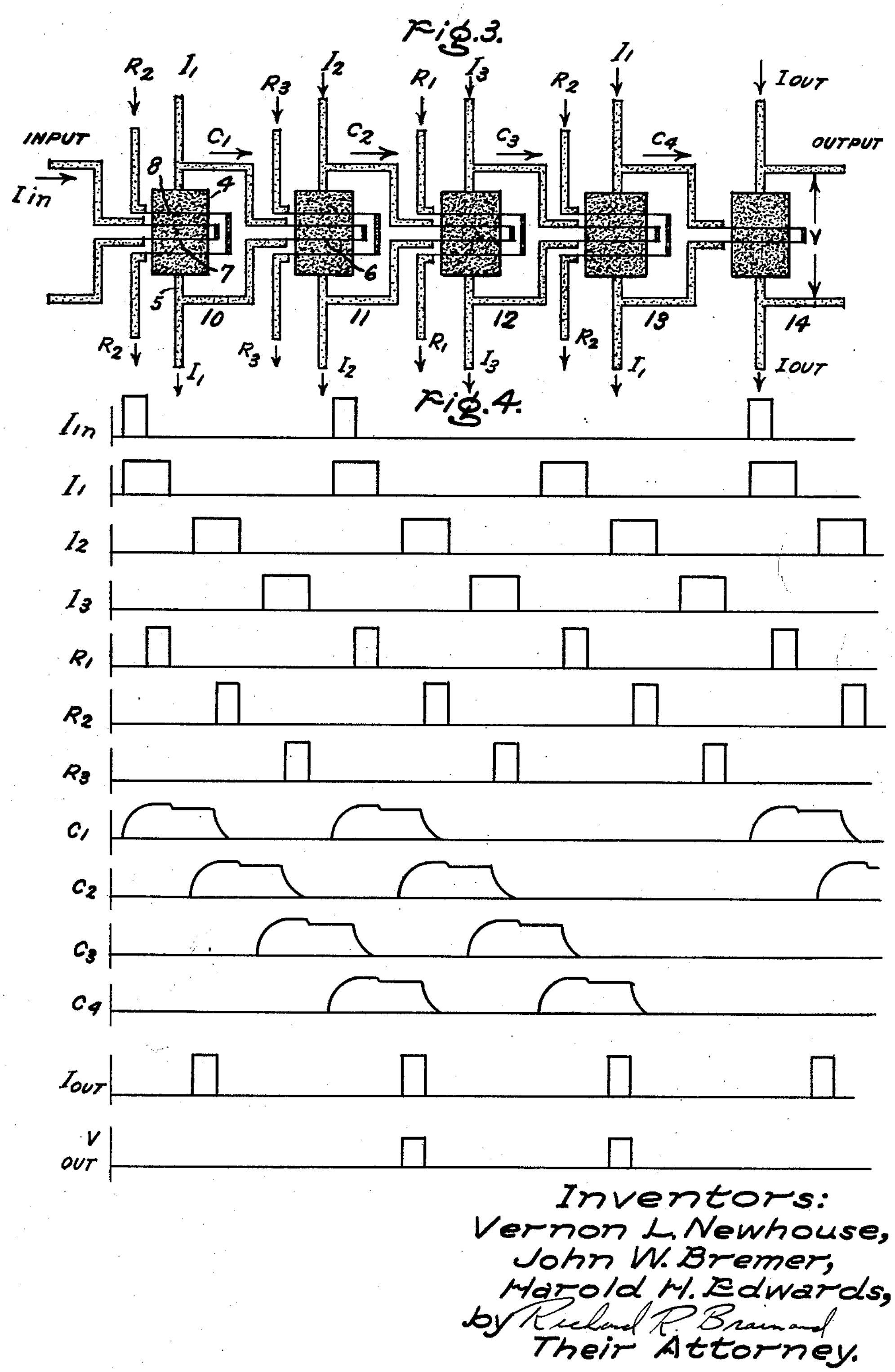
FIGURE 3 is a schematic diagram of a shift register according to the present invention constituted of a plurality of interconnected FIGURE 1 cells.
FIGURE 4 is a chart of waveforms illustrating the operation of a shift register of FIGURE 3.

FIGURE 3 illustrates schematically the operation of a shift register according to the present invention formed of a plurality of cooperating FIG. 1 units, shown in simplified form, respectively designated at 10, 11, 12 and 13. Of course, a greater number of units can and would ordinarily be employed, the present number being chosen for convenience of illustration only. A unit 14, differing from the others only in the omission of a reset grid, is employed as a convenient source of output signal and is driven or controlled from the grid branch associated with unit 13.

In the shift register of FIGURE 3, three units are employed per bit of information residing in the register; that is, a bit of information residing in unit 10 is transferred to unit 12 before another bit of information is provided as an input to unit 10. Then, simultaneously with the introduction of such input to unit 10, a bit of information in unit 12 is transferred to unit 13. Unit 13 represents the first element of a similar 3-element portion of the shift register. The parallel gate 4 and output grid 6 of each of the units 10, 11 and 12 are supplied respectively with currents in the form of spaced, consecutively timed pulses $I_1$, $I_2$, and $I_3$, as shown in the chart of waveforms of FIGURE 4. Similarly, the reset grids 8 of units 10, 11 and 12 are supplied with spaced, consecutively timed reset pulses $R_2$, $R_3$, and $R_1$, respectively, which are arranged to coincide in time with the latter portion of correspondingly numbered pulses $I_2$, $I_3$, and $I_1$. Unit 13 is arranged to receive the same control inputs as unit 10, that is pulses $I_1$ and $R_2$.

Although the $I_1$, $I_2$, $I_3$ and $R_1$, $R_2$ and $R_3$ return leads may be returned to ground in each case, they are preferably returned to other similarly designated control current inputs along the register so that all $I_1$ connections, for example, form a continuous series circuit driven by a common constant current source (not shown). In this manner, the same value of $I_1$ will flow through all units, while use of a smaller current supply is permitted.

Operation of the register will be further described in connection with the waveform chart of FIG. 4. Information travels from left to right in the register. To inject a "one" into the register, the input, connected to grid 7, is pulsed with a current $I_{in}$ while advance control current $I_1$ is on. $I_{in}$ flowing in the input grid 7 diverts $I_1$ from the gate 4 of unit 10 to its output grid 6 and, when $I_1$ terminates, a circulating current $C_1$ remains in the first storage unit as hereinbefore described. $I_2$ is now injected into unit 11. Due to the existence of $C_1$, $I_2$ will be diverted to the output grid 6 of unit 11. It is necessary at this time to destroy $C_1$. $C_1$ has to be destroyed before $I_2$ is switched off since, otherwise, $C_2$, the circulating current in unit 11 caused by the effect of $C_1$ on $I_2$, would be destroyed. This is accomplished by passing current $R_2$ through the reset winding 8 of unit 10. After $C_1$ has been destroyed and $I_2$ has been switched off, the injected "one" is represented by the circulating current $C_2$ in unit 11. In similar fashion $C_3$ is created and $C_2$ is destroyed. Only now can a new "one" be injected into the first storage cell, while $C_4$ is created and $C_3$ destroyed.

The output grid of unit 13 crosses an output unit 14 whose resistance is an indication of the presence or absence of a circulating current $C_4$ in unit 13. A current $I_{out}$ is inserted through the gate of unit 14 at the time when $C_4$ would be expected to occur; if a voltage drop V is detected cross this gate, this indicates the presence of resistance therein caused by $C_4$ flowing in the overlying grid and therefore a "one" stored. A distinguishable voltage may be detected across the gate of any unit in the shift register when an advanced control current, designated generally as $I_n$, is injected into the gate thereof. The presence of a voltage indicates the presence of a circultaing current stored in the unit just previous.

It is understood that although "I" and "R" pulses on the chart of waveforms are shown as occurring periodically, these signals are applied to the register only when it is desired to shift information therealong. When it is desired to hold information at a given point in the register, the advance control pulses are terminated at a given point in the cycle with a particular $I_n$ and $R_n$ of the same subscript. Information may then be detected in the register by pulsing a given unit with its $I_n$ from a separate source, for example, while measuring the voltage thereacross by any convenient means. The presence of a distinguishable voltage indicates the presence of a current stored in the previous unit.

Figure 5:
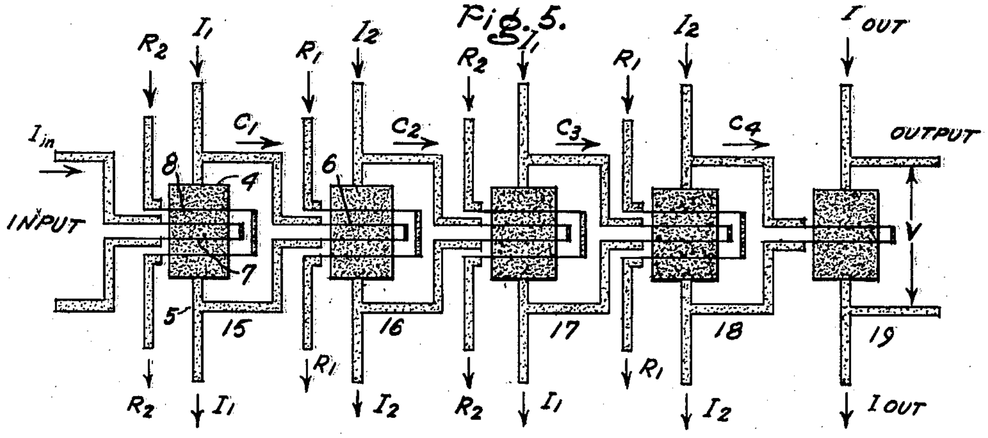
FIGURE 5 is a schematic diagram of an alternative form of shift register according to the present invention.

It is seen from the embodiment of FIGURE 3 that a persistent current bit in a given unit diverts the current for the purpose of establishing a persistent current in the next succeeding unit, before itself being cancelled. For a period, then, "C" currents exist in two successive units, i.e., the persistent current in a given unit and the diverted current in the next succeeding unit. If units were then cascaded in a shift register by twos, instead of threes, all diverted currents would destroy all current flow in persistent current units following next thereafter, thereby erasing all information from the register. For this reason three units are employed per bit. However, units may be arranged by numbers in excess of three units per bit as illustrated in the embodiment of FIG. 5, thereby effecting a saving in the number of control current sources. In the FIG. 5 register, FIG. 1 type units 15, 16, 17, 18 and 19 are consecutively cascaded in that order. The construction, operation and readout of this register is essentially the same as that shown in FIG. 3, the difference being essentially in the mode of operation, and the order of advance control currents employed. In this register, an input $I_{in}$ may be inserted coincident only with every other occurrence of $I_1$. Control advance currents $I_1$ are supplied to units 15 and 17 while control advance currents $I_2$ spaced between $I_1$ pulses are supplied to units 16 and 18. Reset currents $R_1$ are supplied the reset grids 8 of units 16 and 18 while reset currents $R_2$ are supplied units 15 and 17, at intermediate times.

Figure 6:
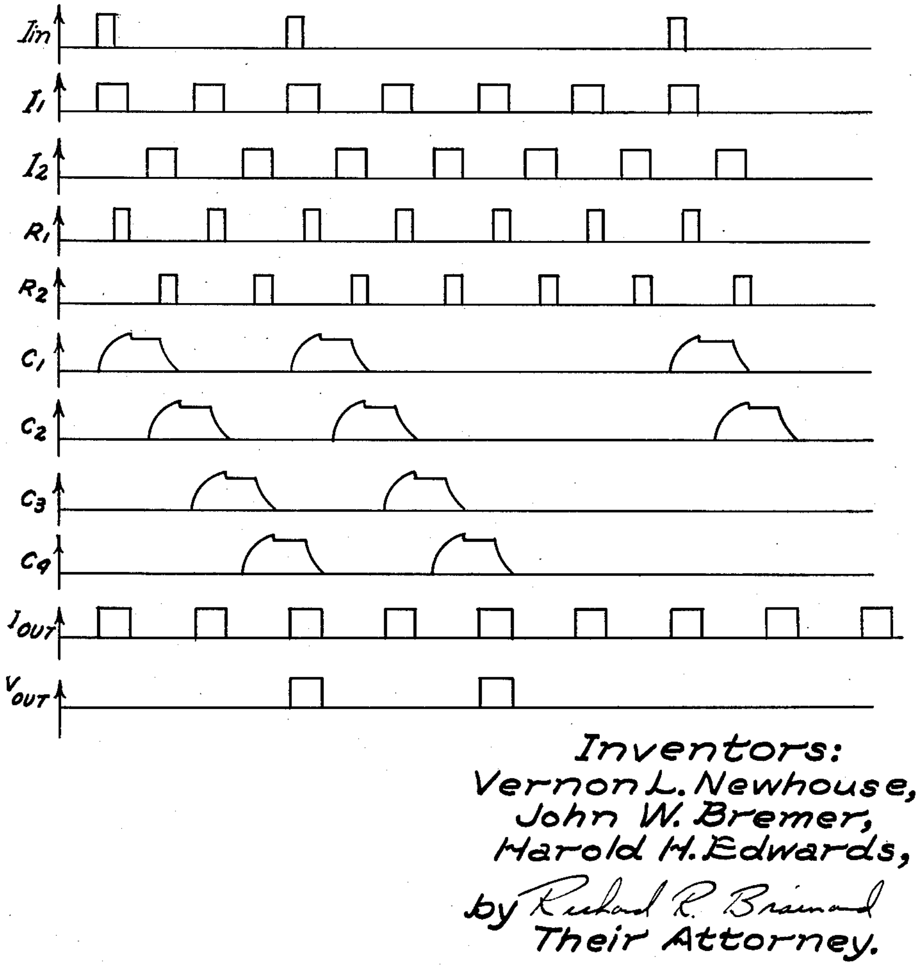
FIGURE 6 is a chart of waveforms for the FIGURE 5 device.

Consider the operation in connection with the FIG. 6 waveform chart. Information again travels from left to right. To inject "one" into the register, the input grid 7 is pulsed while an advanced current pulse $I_1$ is on. This diverts $I_1$ from the gate 4 of units 15 to its output grid 9, and when $I_1$ terminates, a circulating current $C_1$ remains in the first storage unit. $I_2$ is now injected into the second storage unit. According to the existence of $C_1$, $I_2$ will be diverted to the output grid 6 of unit 16. It is necessary at this time to destroy $C_1$. $C_1$ has to be destroyed before $I_2$ is switched off since otherwise it will be impossible to store current in the second storage unit. This is accomplished by passing a current $R_2$ through the reset grid 8 of unit 15. After $C_1$ has been destroyed and $I_2$ switched off, the injected "one" is represented by a circulating current $C_2$ in unit 16. In a similar fashion, $C_3$ is created and $C_2$ is destroyed. Likewise $C_4$ is created and $C_3$ destroyed. Only then can a new "one" be injected into the first cell 15. It is seen that by employing four units per bit of information stored, it is possible to cut the number of advance control current sources required by one-third, that is by employing sources to supply only currents $I_1$ and $I_2$ as well as currents $R_1$ and $R_2$, and eliminating the previous $I_3$ and $R_3$.

Analysis of the shift register circuit according to the present invention indicates the proper values for the advance control currents supplied the various units of the register and proper value of the input current for the first unit of the register. Analysis also indicates that high speed operation is possible. Consider the arrangement of cyrogenic electronic FIG. 1 type units illustrated in FIG. 7*a*, which corresponds to the shift register according to the present invention except for a non-inclusion of reset grids for the sake of clarity. FIG. 7*b* illustrates operating curves for this apparatus in which the curve $i_1=f(i_2)$ is the characteristic operating curve for the basic unit, indicating corresponding values of grid and gate currents necessary to just render a particular gate resistive. It is seen that any advance control current $I_{3n}$ in FIG. 7*a* must not exceed $I_c$ in FIG. 7*b*, or switching will occur before the grid current is applied.

For a long series of identical units, each employing an advance control current of $i_{3n}=I_0$ (in FIG. 7*b*) the $i_1$'s and $i_2$'s in the gate and grid portions of each unit will approach equilibrium values determined by the simultaneous solution of $i_1=f(i_2)$ and $i_2=I_0-i_1$.

The curve of the latter equation is illustrated in FIG. 7*b* with the former. It is seen there are two points, A and B where the two equations are both satisfied. FIG. 7*b* also shows that $i_{3n}$ should have value, for example, $I_0$, that allows two curves to intersect and have common solutions; if the curves do not intersect, shift register operation is not possible.

There are three regions in the figure where the input current $i_{20}$ could lie. Graphical analysis shows that (1) If $i_{20}$ is less than $i_{2A}$, then the stored current in succeeding units will tend to 0;

(2) If $i_{2A}<i_{20}<i_{2B}$, the stored current in successive units will increase to $i_{2B}$;

(3) If $i_{20}$ is greater than $i_{2B}$, the stored currents in successive units will decrease to $i_{2B}$.

Thus "B" is a stable equilibrium point and the requirement on the input current for circulating current to propagate along the register is $$i_{20} \text{ greater than } i_{2A}$$

The current $i_{11}$ flowing through the corresponding gate will be found from the curve $i_1=f(i_2)$. This current will then establish the value of $i_2$, diverted, from the curve $i_2=I_0-i_1$ which will in turn establish a current $i_{22}$ flowing through the next stage, etc. It is seen that if $i_{20}$ exceeds A, operation of succeeding units in the shift register will rapidly move to point B.

In the foregoing analysis it is always assumed that equilibrium conditions have been attained before a current pulse is turned on or off. In order to obtain high speed of operation from the shift register, switching should desirably occur at non-equilibrium conditions. The reset current pulse which destroys the stored current of a unit can be activated before the stored current completely switches the $i_{3n}$ of the following cell to the grid in the form of $i_{2n}$, and the reset current need not completely destroy the stored current. For non-equilibrium switching conditions, a new curve shown on FIG. 7*b*, for example, $i_1=f'(i_2)$, will now characterize operation of each unit. This curve no longer particularly defines the superconducting region of the cryogenic electronic units but rather defines the relation between $i_1$ and $i_2$ for a certain pulse configuration. $f'(i_2)$ will change as the pulse configuration changes but must always cross the curve $i_2=I_0-i_1$. For low speed operation, of course, $f'(i_2)$ becomes $f(i_2)$.

Relatively high speed operation of the four stage per bit register of FIG. 5 has been achieved with advance control and reset current pulses occurring every 7 microseconds, i.e., at approximately 140 kc. The information rate is, of course, one-half of that, in the case of the FIG. 5 register. Advance pulses employed were 3 microseconds long while the reset pulses were 1.2 microseconds in length.

The small space and ease of deposition of the register devices according to the present invention make it possible to deposit the equivalent of a present day rack of computing equipment on a small glass or metallic plate in a short time. Each unit as deposited is very economical in cost as well as space consumption, and registers in accordance with the present invention may have associated computer logic conveniently deposited in close proximity thereto. Extremely compact memory organizations employing devices of this type may be advantageously substituted for magnetic drum magnetic core or tape, transistor, or other conventional systems.

It is also to be noted that the shift register according to the present invention is capable of storing information in the circulaing loops thereof despite loss of power and without the continued operation of supply current pulses. It is therefore economical in power consumption, especially when large units are employed, and will not lose its information with loss of power.

While we have shown and described several embodiments of our invention it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A shift register comprising a plurality of consecutive superconductive loop circuits capable of carrying persistent currents and deposited upon a common substrate, each including a high critical field grid, and each including a gate in parallel therewith capable of being rendered resistive at a lower critical field wherein the grid of each loop circuit is superposed with respect to and insulated from the gate of the next consecutive loop circuit so that a current in each said grid generates a magnetic field for rendering resistive the gate of the next loop circuit, each gate being formed of substantially similar superconductive material for becoming resistive under the influence of substantially the same value of magnetic field, and connection means for selectively introducing a first current directly into a given loop circuit in parallel with its grid and gate so that a current in the immediately prior loop circuit will act to divert the current in the given loop circuit for the purpose of establishing a persistent current in the given loop circuit whereby two successive grids are activated at the same time, said shift register loop circuits being cascaded in units of at least three loop circuits per stored bit for avoiding cancellation of persistent currents in said shift register.

2. A shift register comprising a plurality of consecutive superconductive loop circuits capable of carrying persistent currents and deposited upon a common substrate, each including a high critical field grid, and each including a gate in parallel therewith capable of being rendered resistive at a lower critical field wherein the grid of each loop circuit is superposed with respect to and insulated from the gate of the next consecutive loop circuit so that a current in each said grid generates a magnetic field for rendering resistive the gate of the next loop circuit, each gate being formed of substantially similar superconductive material for becoming resistive under the influence of substantially the same value of magnetic field, connection means for selectively introducing a first current directly into a given loop circuit in parallel with its grid and gate so that current in the immediately prior loop circuit will act to divert the current in the given loop for the purpose of establishing a persistent current in the given loop circuit whereby two successive grids are activated at the same time, said shift register loop circuits being cascaded in units of at least three loop circuits per stored bit for avoiding cancellation of persistent currents in the shift register, and reset grid means deposited in superposed relation with respect to each loop circuit for carrying currents independent of loop circuit currents for the purpose of generating a magnetic field proximate each loop circuit sufficient for terminating the persistent current therein after transferral thereof along the register.

3. A shift register comprising a plurality of consecutive superconductive loop circuits capable of carrying persistent currents and deposited upon a common substrate, each including a high critical field grid, and each including a gate in parallel therewith capable of being rendered resistive at a lower critical field wherein the grid of each loop circuit is superposed with respect to and insulated from the gate of the next consecutive loop circuit so that a current in each said grid generates a magnetic field for rendering resistive the gate of the next loop circuit, each gate being formed of substantially similar superconductive material for becoming resistive under the influence of substantially the same value of magnetic field, connection means for selectively introducing a first current directly into a given loop circuit in parallel with its grid and gate, so that a current in the immediately prior loop circuit will act to divert the current in the given loop for the purpose of establishing a persistent current in the given loop circuit whereby two successive grids are activated at the same time, said shift register loop circuits being cascaded in units of at least three loop circuits per stored bit for avoiding cancellation of persistent currents in the shift register, and reset grid means deposited in superposed relation with respect to each of said gates and carrying currents independent of loop circuit currents to independently generate a magnetic field proximate each loop circuit sufficient for terminating the persistent current therein after transferral thereof along the register.

4. A shift register comprising a plurality of consecutive superconductive loop circuits capable of carrying persistent currents and deposited upon a common substrate, each having a first branch including a high critical field grid, and each having a second branch of materially lower inductance in parallel therewith including a gate capable of being rendered resistive at a lower critical field, wherein the grid of each loop circuit is superposed with respect to and insulated from the gate of the next consecutive loop circuit so that a current in each said grid generates a magnetic field for rendering resistive the gate of the next loop circuit, each gate being formed of substantially similar superconductive material for becoming resistive under the influence of substantially the same value of magnetic field, connection means for selectively introducing a first current directly into a given loop circuit in parallel with its grid and gate so that current in the immediately prior loop circuit will act to divert the current in the given loop for the purpose of establishing a persistent current in the given loop circuit whereby two successive grids carry current at the same time, said shift register loop circuits being cascaded in units of at least three loop circuits per stored bit for avoiding cancellation of persistent currents in the shift register, and plural reset grid means deposited in superposed relation with respect to each loop circuit and carrying currents independent of loop circuit currents for generating a magnetic field proximate each loop circuit sufficient for terminating the persistent current therein after transferral thereof along the register.

5. A method of operating a shift register composed of consecutively arranged cryogenic electronic loop circuits each including a grid and a gate in parallel therewith with the grid of each circuit disposed proximate the gate of the succeeding circuit, each said gate being formed of substantially similar superconducting material for becoming resistive under the influence of substantially the same value of magnetic field, and a reset grid associated with each gate, said method comprising the steps of: first presenting a current pulse across one of said gates, while receiving an input pulse on the grid proximate said gate; then presenting a current pulse across a second and next consecutive gate and before termination of the latter pulse energizing the reset grid associated with the first of said gates; then presenting a current pulse across a third consecutive gate and before the termination of the latter pulse energizing the reset grid associated with the second of said gates; and then receiving another input pulse.

6. A method of operating a shift register composed of consecutively arranged cryogenic electronic loop circuits each including a grid and a gate in parallel therewith with the grid of each circuit disposed proximate the gate of the succeeding circuit, each said gate being formed of substantially similar superconducting material for becoming resistive under the influence of substantially the same value of magnetic field, and a reset grid associated with each gate, said method comprising the steps of: first presenting a current pulse across one of said gates while receiving an input on the grid proximate said gate; then presenting a current across the next consecutive gate and before the termination of the latter pulse energizing a reset grid means associated with the first of said gates; presenting a current pulse across the third consecutive gate and before termination of the latter pulse energizing a reset grid means associated with the second of said gates; presenting a current pulse across the fourth consecutive gate and before the termination of the latter pulse energizing the reset grid means associated with the third of said gates; and then receiving another input pulse.

References Cited in the file of this patent

UNITED STATES PATENTS

| | | |
|---|---|---|
| 2,888,201 | Housman | May 26, 1959 |
| 2,913,881 | Garwin | Nov. 24, 1959 |
| 2,966,647 | Lentz | Dec. 27, 1960 |
| 3,019,354 | Anderson et al. | Jan. 30, 1962 |

OTHER REFERENCES

I.B.M. Technical Disclosure Bulletin, vol. 2, No. 2, August 1959, pages 53, 54.